(12) United States Patent
Fukushi

(10) Patent No.: US 8,391,799 B2
(45) Date of Patent: Mar. 5, 2013

(54) MOBILE COMMUNICATION TERMINAL PERFORMING CELL SEARCH PROCESS

(75) Inventor: Saori Fukushi, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 266 days.

(21) Appl. No.: 12/724,643

(22) Filed: Mar. 16, 2010

(65) Prior Publication Data
US 2011/0076958 A1    Mar. 31, 2011

(30) Foreign Application Priority Data
Sep. 28, 2009    (JP) ................ P2009-221968

(51) Int. Cl.
*H04B 17/00* (2006.01)
*H04B 1/00* (2006.01)
*H04B 15/00* (2006.01)
*H04W 36/00* (2009.01)
*H04W 72/00* (2009.01)

(52) U.S. Cl. ............ 455/67.11; 455/437; 455/436; 455/450; 455/63.1

(58) Field of Classification Search ............... 455/67.11
See application file for complete search history.

(56) References Cited

U.S. PATENT DOCUMENTS

| | | | |
|---|---|---|---|
| 2009/0213833 A1* | 8/2009 | Cai et al. | 370/350 |
| 2010/0035611 A1* | 2/2010 | Montojo et al. | 455/434 |
| 2011/0171962 A1* | 7/2011 | Iwamura et al. | 455/437 |

FOREIGN PATENT DOCUMENTS

| | | |
|---|---|---|
| JP | 2001-186561 A | 7/2001 |
| JP | 2009-049661 A | 3/2009 |

* cited by examiner

*Primary Examiner* — Temesghen Ghebretinsae
*Assistant Examiner* — Devan Sandiford
(74) *Attorney, Agent, or Firm* — Maschoff Gilmore & Israelsen

(57) ABSTRACT

A mobile communication terminal includes: an antenna that performs transmission and reception of a wireless signal; a communication unit that performs communication with a base station by establishing a wireless communication line with the base station through the antenna; a memory unit that stores synchronization information of the wireless communication line established by the communication unit; a measuring unit that measures reception power level and signal quality of the wireless signal received by the antenna; and a cell search processor that detects the base station based on the synchronization information stored in the memory unit in a case where the reception power level is larger than a predetermined value and the signal quality is lower than a predetermined signal quality threshold value.

9 Claims, 5 Drawing Sheets

MOBILE COMMUNICATION TERMINAL PERFORMING CELL SEARCH PROCESS

CROSS-REFERENCE TO THE RELATED APPLICATION(S)

The present application is based upon and claims priority from prior Japanese Patent Application No. 2009-221968, filed on Sep. 28, 2009, the entire contents of which are incorporated herein by reference.

BACKGROUND

1. Field

The present invention relates to a mobile communication terminal that performs a cell search process and a cell search control program for the mobile communication terminal.

2. Description of the Related Art

Recently, portable mobile communication terminals having a wireless communication function have become widely used in accordance with prevalence of wireless communication lines. Cellular phones as examples of the mobile communication terminals having a wireless communication function include a voice communication function and a data communication function for communicating over a wireless communication line. The cellular phones are used for various purposes such as voice calls, transmission and reception of an E-mail, and website browsing. Recently, in accordance with the decrease in size and weight of cellular phones, the number of cases where a cellular phone continues to communicate while being moved a physically long distance is increased.

Generally, the cellular phones use a wireless communication system called a cellular communication system. In a cellular communication system, each base station sets up wireless communication lines with cellular phones located within a predetermined range (hereinafter, simply referred to as a cell) with the base station used as the center and communicates with the cellular phones. Cells are available by disposing a plurality of base stations, and cellular phones moving a long distance are moved across the cells.

Among the cellular communication methods, according to a communication method called OFDMA (Orthogonal Frequency Division Multiple Access) or CDMA (Code Division Multiple Access), when a cellular phone moves from a given cell to another cell, the cellular phone performs a so-called cell search process. By performing the cell search process, the cellular phone can set up synchronization of a wireless signal with a base station that provides the cell of the movement destination and detects the base station. Such a cell search process is generally performed in a case where a cellular phone is determined to have moved between cells. Determination on the movement of the cellular phone between cells is performed, for example, by regularly evaluating the value of reception signal power of the wireless signal that is received by an antenna of the terminal or the like and determining a case where the reception signal power is less than a predetermined level as movement between cells.

The cellular phone is capable of maintaining the connection of the wireless communication line even in cases where the cellular phone is moved across the cells by reselecting a cell or performing a hand-over process based on the result of the cell search process. Examples of such technique are disclosed in JP-A-2009-049661 and in JP-A-2001-186561.

However, according to the above-described cellular system, there are places, such as areas where there are many persons using cellular phones and traffic is concentrated, or places where there are many shielding objects and substantial radio wave interference nearby, in which a wireless communication line of sufficient signal quality cannot be provided even within a cell.

In order to provide a wireless communication line in such a place having a poor communication environment, a technique for disposing a small scaled base station (hereinafter, simply referred to as a femtocell base station) in a place having a poor communication environment and locally providing wireless communication lines is in practical use. Since the range in which a femtocell base station provides wireless communication lines is a small range on the order of several tens of meters, the range in which such wireless communication lines are provided is generally called a femtocell.

Since the above-described femtocell is disposed so as to supplement a place having a locally poor communication environment, there are many cases where the femtocell is disposed in a state being included in a range (hereinafter, simply referred to as a macrocell) in which a large scaled base station (hereinafter, simply referred to as a macrocell base station) provides wireless communication lines. In such a case, a cellular phone that is within the zone of the femtocell is simultaneously within the zone of the macrocell.

Generally, the number of wireless communication lines that can be provided by a base station is limited. Accordingly, in view of stability of wireless communication lines, it is preferable that the number of wireless communication lines established by one base station is small. However, the number of wireless communication lines established by a macrocell base station is vast based on the space of the cell area. Accordingly, in order to provide the wireless communication lines of a macrocell base station in a stable manner, a cellular phone that is simultaneously within the zone of a macrocell and the zone of a femtocell needs to establish a wireless communication line with the femtocell base station first.

While there is a request for allowing a cellular phone to be used in a femtocell first, in a conventional cellular phone as described above, determination on whether or not to perform a cell search process is made based on the evaluation of the signal quality of the wireless signal. Accordingly, in a case where the signal quality of the wireless signal transmitted from the macrocell base station is good, the cell search process is not performed, and thereby the femtocell cannot be detected. In such cases, there is a problem in that the wireless communication line cannot be set up with a femtocell base station even in a case where the cellular phone is simultaneously within the zone of the macrocell and the zone of the femtocell.

In addition, in a case where detection of such a femtocell is performed, as disclosed in the publication, JP-A-2009-049661, the cellular phone needs to perform the cell search process at a constant time interval. However, in a case where the cell search process is performed at the constant time interval, the cell search process is repeated at the constant time interval even in a case where the cellular phone is out of the zone of a femtocell. Accordingly, the processing load and the consumed current accompanied with the cell search process of the cellular phone are increased, and the continuous use time of the cellular phone may be decreased.

SUMMARY

One of objects of the present invention is to provide a mobile communication terminal and a cell search control program for the mobile communication terminal which are capable of improving stability of communication.

According to a first aspect of the present invention, there is provided a mobile communication terminal including: an antenna that performs transmission and reception of a wireless signal; a communication unit that performs communication with a base station by establishing a wireless communication line with the base station through the antenna; a memory unit that stores synchronization information of the wireless communication line established by the communication unit; a measuring unit that measures reception power level and signal quality of the wireless signal received by the antenna; and a cell search processor that detects the base station based on the synchronization information stored in the memory unit in a case where the reception power level is larger than a predetermined value and the signal quality is lower than a predetermined signal quality threshold value.

According to a second aspect of the present invention, there is provided a computer-readable medium containing a computer program executable by a computer system for a mobile communication terminal to cause the computer system to operate in accordance with a sequence of procedure, the procedure including: performing communication with a base station by establishing a wireless communication line with a base station through an antenna; storing synchronization information of the wireless communication line; measuring reception power level and signal quality of a wireless signal received by the antenna; and detecting the base station based on the synchronization information in a case where the reception power level is larger than a predetermined value and the signal quality is lower than a predetermined signal quality threshold value.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

Figure 1:
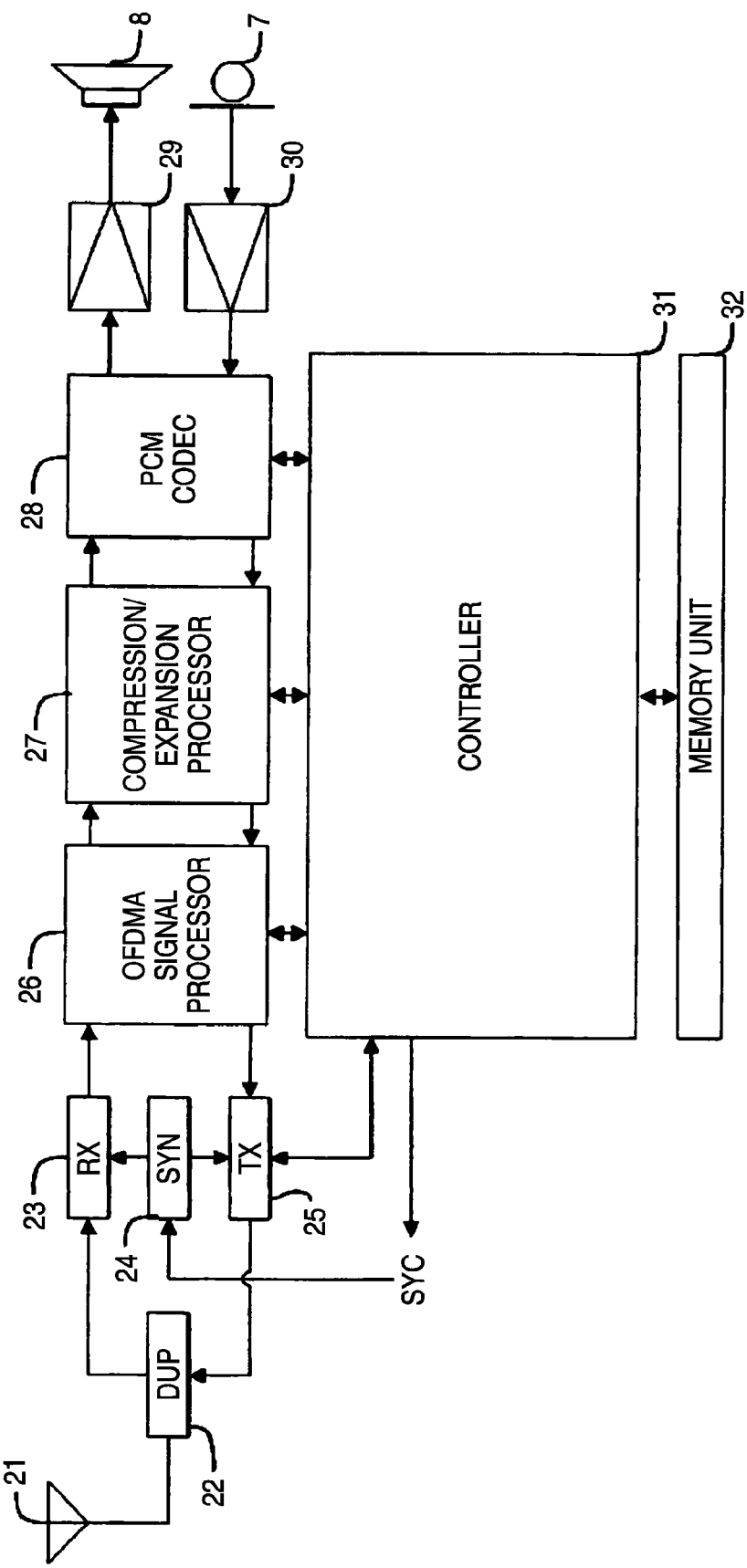
FIG. 1 is a block diagram showing an internal configuration of a cellular phone as a mobile communication terminal according to an embodiment of the present invention.

An embodiment according to the present invention will be described in detail with reference to the accompanying drawings. The scope of the claimed invention should not be limited to the examples illustrated in the drawings and those described below.

FIG. 1 is a block diagram showing an internal configuration of a cellular phone as an example of a mobile communication terminal according to the embodiment.

A controller 31 that is mounted in the cellular phone is configured by an electronic circuit such as a CPU (Central Processing Unit). The CPU runs various processes in accordance with a program that is stored in a ROM or a RAM, which will be described later. The CPU processes signals supplied from the above-described circuits, generates various control signals, and supplies the generated control signals to the circuits. By performing such processes, the CPU controls the overall operation of the cellular phone.

A memory unit 32, for example, is configured by a flash memory element as a non-volatile memory that can be electrically rewritten or erased, an HDD (Hard Disk Drive), a ROM (Read Only Memory), a RAM (Random Access Memory), and the like. In the memory unit 32, a base station list that is used for a cell search determination to be described later is stored, in addition to various application programs executed by the CPU of the controller 31 and a data group. In the base station list that is stored in the memory unit 32, information on cell search processes of base stations with which the cellular phone has previously set up wireless communication line is stored.

The base station list is divided into two base station lists of a macrocell base station list and a femtocell base station list. In each base station list, cell ID information that uniquely specifies a base station, synchronization timing information that is used for the cell search process to be described later, code pattern information, the type of a base station, that is, information indicating whether a base station is a macrocell base station or a femtocell base station, and the like are recorded for each base station.

However, information recorded in the base station list is not limited thereto. In a case where a communication method, to be described later, used by the cellular phone is performed by using a diffusion code of the CDMA communication method, diffusion code information may be recorded in the base station list. In addition, transmission power information for each base station may be recorded therein.

In addition, the cellular phone includes an antenna 21 and performs transmission or reception of a wireless signal through the antenna 21. Hereinafter, a transmission/reception process of a wireless signal will be described in more detail. A wireless signal transmitted from a base station is received by the antenna 21 and then, is input to a receiver circuit (RX) 23 through an antenna duplexer (DUP) 22. The receiver circuit 23 performs frequency conversion (down conversion) for the wireless signal into an intermediate frequency signal by mixing the received wireless signal and a local transmission signal output from a frequency synthesizer (SYN) 24. Then, the receiver circuit 23 demodulates the intermediate frequency signal that has been down-converted and outputs the demodulated intermediate frequency signal as a reception baseband signal.

In addition, the receiver circuit (RX) 23 measures the reception power and the signal quality of the received wireless signal. The measurement of the reception power may be performed by measuring a value such as an RSSI (Received Signal Strength Indicator) or an RSRP (Reference Signal Received Power). The measurement of the signal quality is performed by measuring a reference value that is used for evaluating the noise component or the interference component as the signal quality. In particular, the signal quality may be measured, for example, by measuring an SINR (Signal to Interference and Noise Power Ratio), an Es/Io (Energy Per Symbol to Interference Density Ratio), or an SIR (Signal to Interference Ratio). In addition, the values used for measuring the reception power and the signal quality are not limited thereto, and various values may be used for the measurement.

The reception baseband signal that is output from the receiver circuit 23 is input to an OFDMA signal processor 26. The OFDMA signal processor 26 generates reception data of a predetermined transmission format from the input reception baseband signal. The reception data output from the OFDMA signal processor 26 is input to a compression/expansion processor 27 from the OFDMA signal processor 26. In a case where the reception data is audio data, a PCM demodulation process is performed for the audio data, which has been processed by the compression/expansion processor 27, by a PCM codec 28 and is converted into an audio signal. The converted audio signal is amplified up to an appropriate level by a receiver amplifier 29 and then is output as audio from a speaker 8.

Next, transmission of a wireless signal through the antenna 21 will be described. As an example, a case where voice is input to a microphone 7 of the cellular phone during a call will be considered. First, the audio signal input to the microphone 7 is amplified up to an appropriate level by a transmitter amplifier 30, and then, PCM encoding is performed for the amplified audio signal by the PCM codec 28. The PCM-encoded digital audio signal is input to the compression/expansion processor 27. In addition, a data signal such as a mail generated by the controller 31 or the like is input to the compression/expansion processor 27.

The OFDMA signal processor 26 converts the transmission data output from the compression/expansion processor 27 into a transmission baseband signal of a predetermined transmission format and outputs the transmission baseband signal to a transmitter circuit (TX) 25. The transmitter circuit 25 modulates the input transmission baseband signal by using a digital modulation method. In addition, the transmitter circuit 25 performs frequency conversion (up conversion) for the transmission baseband signal into a wireless signal by synthesizing the transmission baseband signal and a local transmission signal generated by the frequency synthesizer 24. Then, the transmitter circuit 25 amplifies the up-converted wireless signal so as to satisfy a transmission power level directed by the controller 31. The amplified wireless signal is supplied to the antenna 21 through the antenna duplexer 22 and is transmitted from the antenna 21 to a base station.

In the embodiment, a case where the cellular phone performs communication by using a wireless signal that is transmitted and received in accordance with the above-described OFDMA method, particularly, a communication method defined in LTE (Long Term Evolution) will be described. However, the transmission/reception process of an OFDMA wireless signal used by the cellular phone is not limited to the above-described process and can be performed by using various processes. In addition, the operation of the present invention is not limited thereto. Thus, for example, the cellular phone may be configured to perform communication by using a wireless signal that is modulated in accordance with a different modulation method such as a CDMA method.

Next, a cell search process will be described. In a case where a cellular phone is moved from a cell in which a wireless communication line is set up to another cell, a wireless communication line needs to be established with the base station of the destination cell. In order to set up wireless communication with the base station, the wireless signal that is transmitted or received to or from the base station needs to be synchronized. This process of synchronizing the wireless signal with the base station of the destination cell is the so-called cell search process. Hereinafter, the cell search process performed by the cellular phone will be described.

The above-described cell search process is performed as the cellular phone determines two factors including the reception timing of the wireless signal and the diffusion code for which the OFDMA signal processor 26 performs demodulation in a downlink in which the base station first transmits a wireless signal to the cellular phone. The base station informs all the mobile terminals located within the cell of a synchronization signal used for allowing a cellular phone entering the cell to perform a cell search process. When receiving the synchronization signal through the antenna 21, the cellular phone continuously extracts a code-multiplexed SCH (Synchronization) signal from the synchronization signals. The SCH signal is a signal that includes two sub channels of a P-SCH (Primary SCH) and an S-SCH (Secondary SCH).

The P-SCH is a signal that is used by a cellular phone for detecting a slot timing (hereinafter, simply referred to as a synchronization timing) of a wireless signal transmitted from the base station. The wireless signal, which is transmitted from the base station, is transmitted by being divided for each predetermined time unit called a frame, and the P-SCH is assigned to a predetermined time zone of this frame.

The controller 31 specifies a timing at which the controller 31 receives a frame by specifying a time zone to which the P-SCH is assigned. In a case where information on the time zone to which the P-SCH is assigned is stored in the memory unit 32 in advance by using a method to be described later, the OFDMA signal processor 26 detects a reception timing of the frame based on the time zone information and performs extraction of the S-SCH, to be described later, by using the reception timing of the frame.

On the other hand, in a case where the time zone information is not stored in the memory unit 32, the OFDMA signal processor 26 detects the time zone to which the P-SCH is assigned by performing correlation value analysis using an MF (Matched Filter) and extracts the reception timing of the frame.

The process of detecting the reception timing of the frame, which is stored in the memory unit 32 in advance, puts a smaller calculation load on the controller 31 and requires a shorter time, compared to the process of extracting the synchronization timing by using the MF.

When the OFDMA signal processor 26 detects the reception timing of the frame by performing the above-described process, the OFDMA signal processor detects a cell identification number (hereinafter, simply referred to as a cell ID) of the base station by using the S-SCH.

The S-SCH is a signal that is used by a cellular phone for detecting a cell identification number (hereinafter, simply referred to as a cell ID) of the base station that transmits the synchronization signal. The S-SCH is encoded in the synchronization signal by using a different signal pattern for each base station. Accordingly, the cellular phone needs to specify the signal pattern assigned to the S-SCH and extract the S-SCH.

In a case where signal pattern information and cell ID information assigned to the S-SCH are stored in the memory unit 32 in advance by using a method to be described later, the OFDMA signal processor 26 detects the cell ID by reading out the cell ID information from the memory unit 32.

On the other hand, in a case where the signal pattern and the cell ID information are not stored in the memory unit 32, the OFDMA signal processor 26 specifies a time zone to which the S-SCH is assigned by using the reception timing of the frame that is detected by using the P-SCH. Subsequently, the OFDMA signal processor 26 specifies a signal pattern assigned to the S-SCH by performing correlation calculation of the signal pattern for the time zone.

When extracting the S-SCH, the OFDMA signal processor 26 detects a cell ID from the S-SCH and notifies the controller 31 of the detected cell ID. Here, the process of detecting the information on the signal pattern and the cell ID information stored in the memory unit 32 in advance puts a smaller calculation load on the controller 31 and requires a shorter processing time, compared to the process of detection using correlation calculation of the frequency domain.

By performing the above-described process, so-called a cell search process of detecting the reception timing of a frame, the signal pattern, and the cell ID in a case where the cellular phone enters a new cell is performed. Next, cell search control for performing the cell search process at a more appropriate timing will be described.

Figure 4:
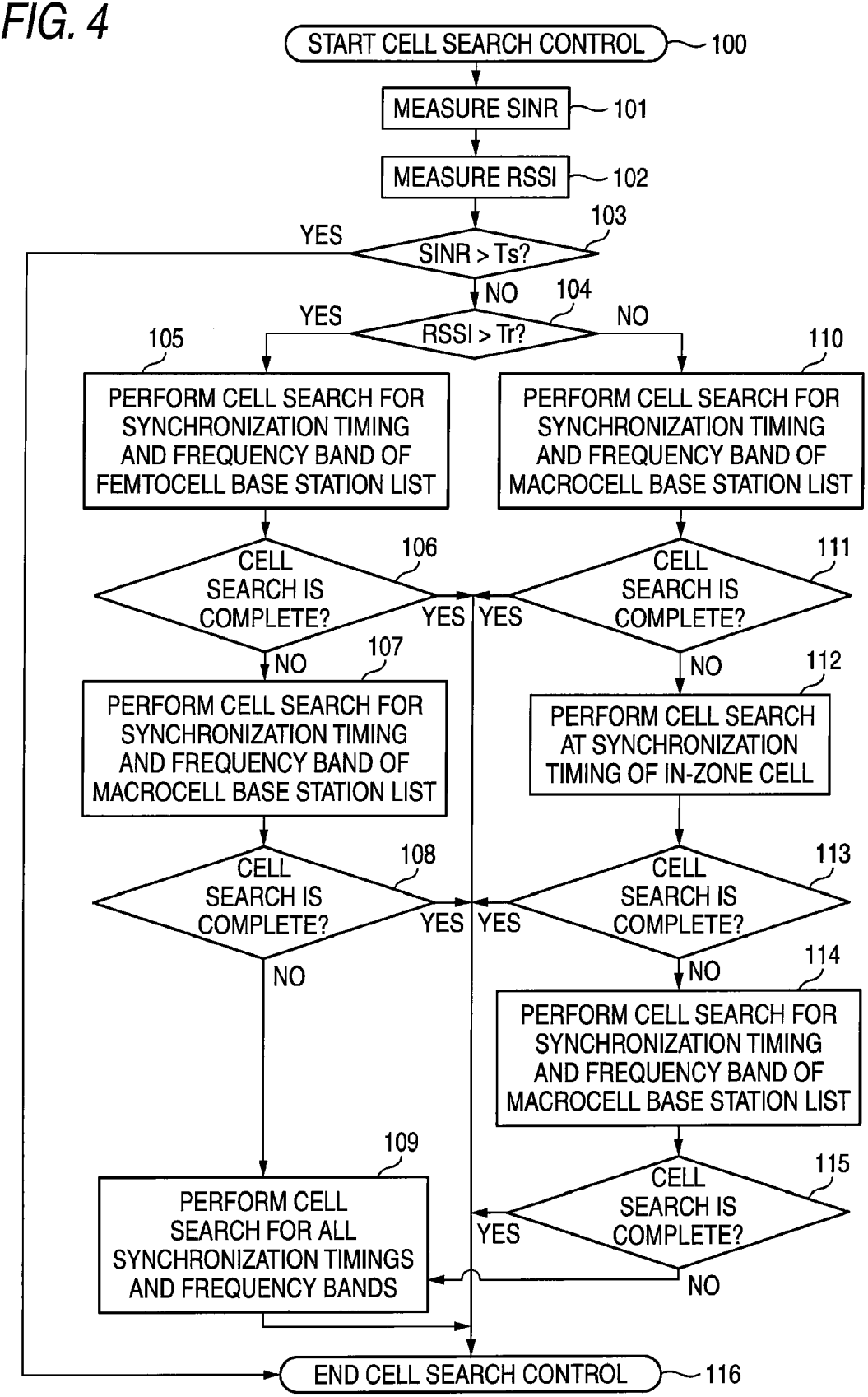
FIG. 4 is a flowchart of a process of performing a cell search determination according to the embodiment.

Hereinafter, the flow of the cell search control process will be described with reference to FIG. 4. FIG. 4 is a flowchart illustrating the flow of the cell search control process. In description below, a cell provided by a base station with which a wireless communication line is established is simply referred to as an serving cell.

First, the flow of the cell search control process will be described with reference to FIG. 4. When the controller 31 starts the cell search control process (Step 100), the receiver circuit (RX) 23 measures the value of the SINR as the signal quality of an serving cell (Step 101). However, the value measured by the receiver circuit (RX) 23 is not limited thereto. Thus, for example, the value of an Es/Io, an SIR, or the like may be measured. In a case where the cellular phone 70 receives a wireless signal other than the established wireless communication line, that is, a noise signal, the value of the SINR is acquired as a low value. In other words, when the cellular phone 70 is moved to the end of the serving cell and is moved in a place in which the serving cell and another cell are overlapped with each other, the RSSI of the serving cell decreases, and the RSSI of a wireless signal of another base station increases. As a result, the value of the SINR decreases.

Next, the receiver circuit (RX) 23 measures the value of the RSSI (Step 102). However, the value measured by the receiver circuit (RX) 23 is not limited thereto. Thus, for example, the value of the RSRP or the like may be measured. Generally, the power level of a wireless signal decreases in proportion to the propagation distance. Accordingly, in a case where the cellular phone 70 sets up the wireless communication line at a short distance from the base station, a high value of the RSSI can be acquired. On the other hand, in a case where the cellular phone 70 establishes a wireless communication line at a long distance from the base station, for example, at a cell boundary, a low value of the RSSI is acquired.

Next, the controller 31 determines whether the value of the SINR measured in Step 101 is larger than a predetermined threshold value Ts (Step 103).

In a case where the controller 31 determines that the value of the SINR is larger than the threshold value Ts (Step 103; Yes), a wireless signal having a sufficient signal quality can be acquired. Accordingly, the controller 31 determines that a cell search is not necessary and ends the cell search control process (Step 116).

On the other hand, in a case where the controller 31 determines that the value of the SINR is less than the threshold value Ts (Step 103; No), the controller 31 subsequently determines whether the value of the RSSI is larger than a predetermined threshold value Tr (Step 104).

The controller 31 determines Yes in Step 104 in a case where the value of the SINR is less than Ts and the value of the RSSI is larger than Tr. In such a case, the controller 31 assumes that the SINR is lowered due to interference between a macrocell and a femtocell since the femtocell is included in the macrocell, and the cellular phone 70 is within the femtocell.

In a case where the value of the RSSI is determined to be larger than Tr (Step 104; Yes), the controller 31 reads out a femtocell base station list that is stored in the memory unit 32. Then, the controller 31 performs a cell search process by using the synchronization timing and the signal pattern that are recorded in the femtocell base station list (Step 105).

By performing the cell search process by using the synchronization timing and the signal pattern which are stored in the femtocell base station list first, the calculation load for performing the cell search process for all the synchronization timings or the frequency domain can be eliminated.

When the controller 31 performs the cell search process in Step 105, the controller 31 determines whether the cell search process has been completed and a base station has been detected (Step 106). In a case where the cell search process has been completed (Yes in Step 106), the controller 31 ends the cell search determination (Step 116). On the other hand, in a case where the cell search process has not been completed (Step 106; No), the controller 31 assumes that the SINR is lowered due to interference between the macrocell and another macrocell. Thus, the controller 31 performs a cell search process by using the synchronization timing and the signal pattern that are recorded in the macrocell base station list (Step 107). By performing the cell search process by using the synchronization timing and the signal pattern which are stored in the macrocell base station list first, the calculation load for performing the cell search process for all the synchronization timings or the frequency domain can be eliminated.

When performing the cell search process in Step 107, the controller 31 determines whether the cell search process has been completed and a base station has been detected (Step 108). In a case where the cell search process has been completed (Step 108; Yes), the controller 31 ends the cell search determination (Step 116). On the other hand, in a case where the cell search process has not been completed (Step 108; No), the controller 31 assumes that the SINR is lowered due to interference from a base station that is not recorded in the base station list. Thus, the controller 31 performs a cell search process for all the synchronization timings and all the signal patterns (Step 108). Then, the controller 31 completes the cell search process and ends the cell search determination (Step 116).

On the other hand, the controller 31 determines No in Step 104 in a case where the value of the SINR is less than Ts and the value of the RSSI is less than Tr. In such a case, the controller 31 assumes that the RSSI is below Tr since the cellular phone 70 is in the zone of a macrocell, and the cellular phone 70 is moved in a boundary area of the in-zone macrocell. In addition, the controller 31 assumes that the SINR is less than Ts since the cellular phone 70 is moved in another cell on the boundary of the in-zone macrocell. In a case where the value of the RSSI is determined to be less than Tr (Step 104; No), the controller 31 reads out the macrocell base station list stored in the memory unit 32. Then, the controller 31 performs a cell search process by using the synchronization timing and the signal pattern that are recorded in the macrocell base station list (Step 110). By performing the cell search process by using the synchronization timing and the signal pattern which are stored in the macrocell base station list first, the calculation load for performing the cell search process for all the synchronization timings and all the signal patterns can be eliminated.

When performing the cell search process in Step 110, the controller 31 determines whether the cell search process has been completed and a base station has been detected (Step 111). In a case where the cell search process has been completed (Step 111; Yes), the controller 31 ends the cell search determination (Step 116). On the other hand, in a case where the cell search process has not been completed (Step 111; No), the controller 31 assumes that the SINR is lowered due to interference from a macrocell that is not recorded in the macrocell base station list. Thus, the controller 31 performs a cell search process by using the synchronization timing for the serving cell (Step 112).

Between macrocell base stations that provide macrocells, the synchronization timings are set to be uniform by using a GPS (Global Positioning System) or the like. Thus, by performing the cell search process by using the synchronization timing of the serving cell first, the calculation load for performing the cell search process for all the synchronization timings can be eliminated.

When performing the cell search process in Step 112, the controller 31 determines whether the cell search process has been completed and a base station has been detected (Step 113). In a case where the cell search process has been completed (Step 113; Yes), the controller 31 ends the cell search determination (Step 116). On the other hand, in a case where the cell search process has not been completed (Step 113; No), the controller assumes that the SINR and the RSSI are lowered due to interference between the serving cell and a femtocell. Thus, the controller 31 performs a cell search process by using the synchronization timing and the signal pattern that are recorded in the femtocell base station list (Step 114). By performing the cell search process by using the synchronization timing and the signal pattern which are stored in the femtocell base station list first, the calculation load for performing the cell search process for all the synchronization timings or the frequency domain can be eliminated.

When performing the cell search process in Step 114, the controller 31 determines whether the cell search process has been completed and a base station has been detected (Step 115). In a case where the cell search process has been completed (Step 115; Yes), the controller 31 ends the cell search determination (Step 116). On the other hand, in a case where the cell search process has not been completed (Step 115; No), the controller 31 assumes that the SINR and the RSSI are lowered due to interference from a base station that is not recorded in the base station list. Thus, the controller 31 performs a cell search process for all the synchronization timings and all the signal patterns (Step 115). Then, the controller 31 completes the cell search process and ends the cell search determination (Step 116).

Figure 2:
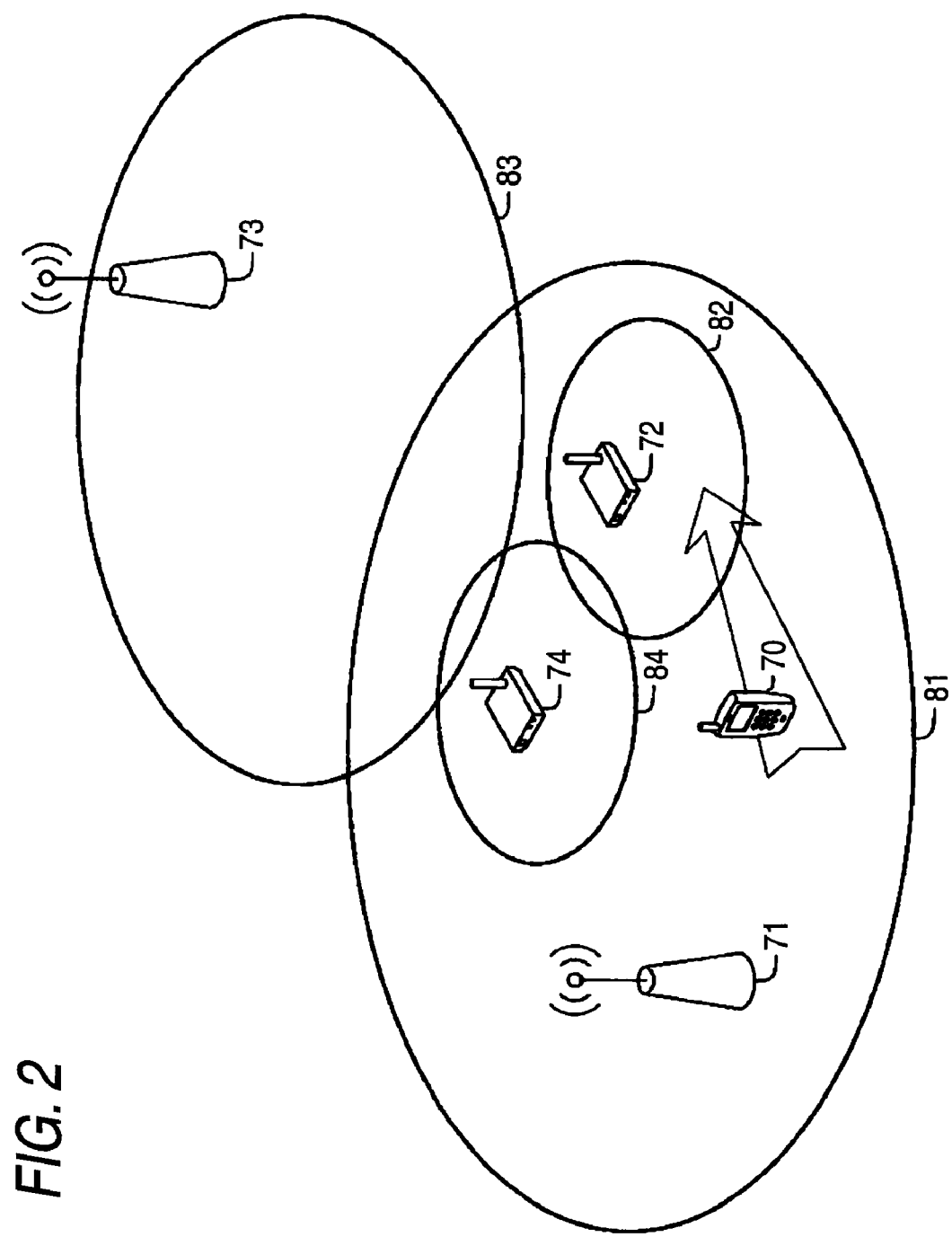
FIG. 2 is a diagram showing the cellular phone moving from a macrocell to a femtocell in a network used as an example in the embodiment.
Figure 3:
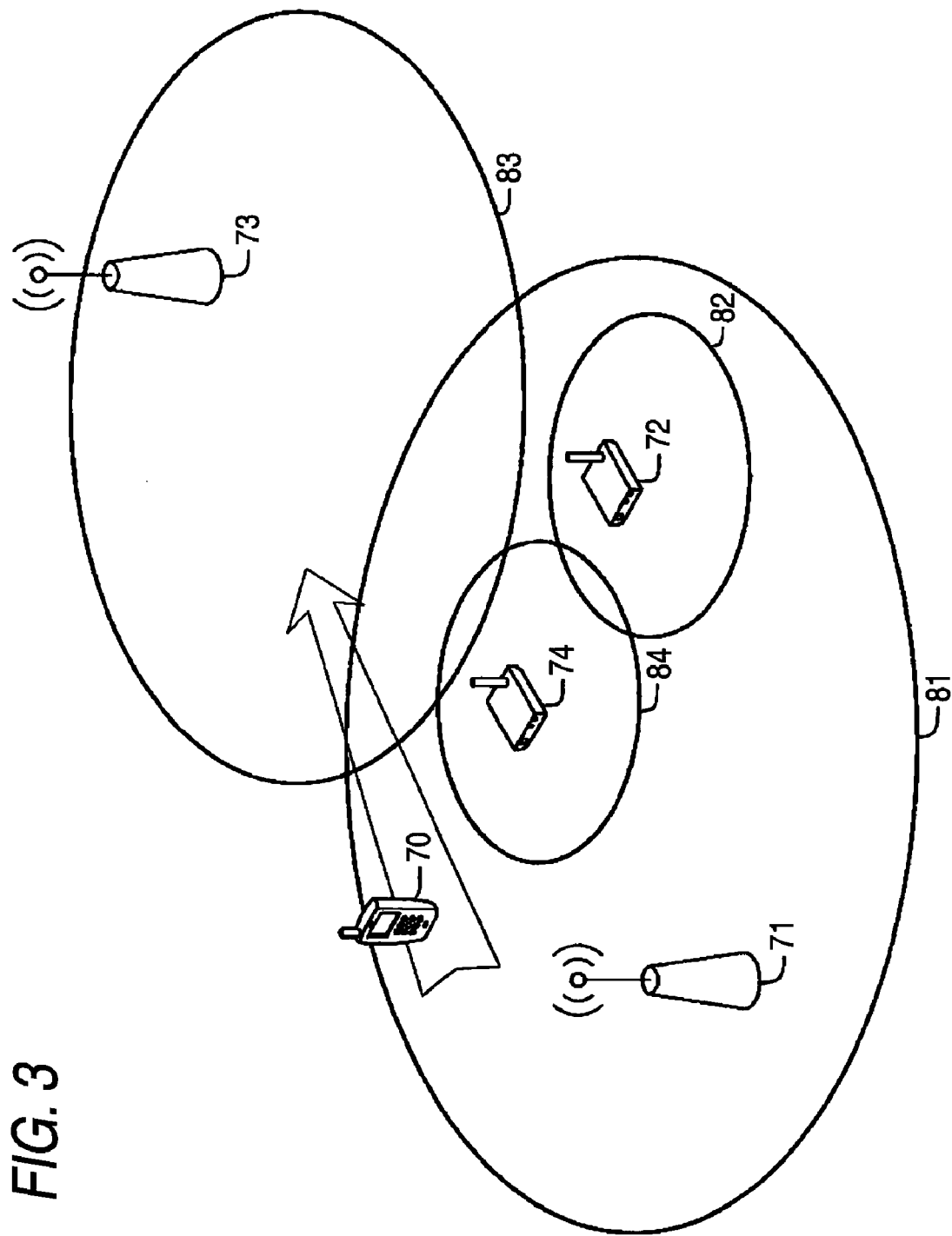
FIG. 3 is a diagram showing the cellular phone moving between macrocells in the network used as an example in the embodiment.

FIGS. 2 and 3 are diagrams showing an example of movement of a cellular phone 70, which communicates with a cellular network configured by a macrocell base station 71 that provides a macrocell 81, a femtocell base station 72 that provides a femtocell 82, a macrocell base station 73 that provides a macrocell 83, and a femtocell base station 74 that provides a femtocell 84, between cells. Hereinafter, the appearance of performing a cell search determination and a cell search process accompanied with movement of the cellular phone 70 between cells will be represented.

FIG. 2 is a diagram showing the example of movement of the cellular phone 70 that is within the zone of the macrocell 81 into the boundary area of the femtocell 82 that is included in the macrocell 81. The receiver circuit (RX) 23 of the cellular phone 70 measures the values of the SINR and the RSSI on a regular basis (Steps 101 and 102), and the controller 31 compares the measured values of the SINR and the RSSI with threshold values Ts and Tr (Steps 103 and 104). On the boundary between the macrocell 81 and the femtocell 82, wireless signals transmitted by the macrocell base station 71 and the femtocell base station 72 are asynchronous. Accordingly, the wireless signals transmitted by the macrocell base station 71 and the femtocell base station 72 interfere with each other. Therefore, when the cellular phone 70 is moved in the boundary between the macrocell 81 and the femtocell 82, the value of the SINR measured by the receiver circuit (RX) 23 is lowered (Step 103; No).

On the other hand, the transmission frequencies of the wireless signals that are transmitted by the macrocell base station 71 and the femtocell base station 72 are the same. Accordingly, the value of the SINR measured by the receiver circuit (RX) 23 is not lowered (Step 104; Yes). In a case where the SINR is equal to or less than Ts, and the RSSI is equal to or larger than Tr, the controller 31 assumes that the cellular phone 70 is moved in the boundary between the macrocell and the femtocell and performs a cell search process. In order to give priority to detection of a femtocell, the controller 31 performs the cell search process by using the synchronization timing and the frequency band that are stored in the memory unit 32 (Step 105).

In a case where information on the femtocell base station 72 is recorded in the femtocell base station list, the controller 31 detects the femtocell base station 72 in Step 105 (Step 106; Yes) and then ends the cell search determination (Step 116). On the other hand, in a case where the information on the femtocell base station 72 is not recorded in the femtocell base station list due to no movement of the cellular phone 70 into the femtocell 82 or the like, the controller 31 cannot acquire a synchronization timing from the base station list (Steps 106 and 108; No). In such a case, the controller 31 detects the femtocell base station 72 by performing the cell search process for all the synchronization timings and all the frequency bands (Step 109).

Next, a case where a cellular phone 70 that is within the zone of the femtocell 82 is moved in the boundary area between the femtocell 82 and a femtocell 84 will be considered.

On the boundary between the femtocell 82 and the femtocell 84, wireless signals transmitted by the femtocell base station 72 and the femtocell base station 74 are asynchronous. Accordingly, the wireless signals transmitted by the femtocell base station 72 and the femtocell base station 74 interfere with each other. Therefore, when the cellular phone 70 is moved in the boundary between the femtocell 82 and the femtocell 84, the value of the SINR measured by the receiver circuit (RX) 23 is lowered (Step 103; No). On the other hand, the transmission frequencies of the wireless signals that are transmitted by the femtocell base station 72 and the femtocell base station 74 are the same. Accordingly, the value of the SINR measured by the receiver circuit (RX) 23 is not lowered (Step 104; Yes). Thereafter, the controller 31 performs the cell search process in the same sequence described as in Steps 104 to 116, and thereby detecting the femtocell base station 74.

Next, a case where a cellular phone 70 that is within the zone of the femtocell 82 is moved in a boundary area between the femtocell 82 and the macrocell 81 will be considered.

On the boundary between the femtocell 82 and the macrocell 81, wireless signals transmitted by the femtocell base station 72 and the macrocell base station 71 are asynchronous. Accordingly, the wireless signals transmitted by the femtocell base station 72 and the macrocell base station 71 interfere with each other. Therefore, when the cellular phone 70 is moved in the boundary between the femtocell 82 and the macrocell 81, the value of the SINR measured by the receiver circuit (RX) 23 is lowered (Step 103; No).

On the other hand, the transmission frequencies of the wireless signals that are transmitted by the femtocell base station 72 and the macrocell base station 71 are the same. Accordingly, the value of the SINR measured by the receiver circuit (RX) 23 is not lowered (Step 104; Yes). Then, the controller 31 performs a cell search process by using the synchronization timing and the signal pattern that are recorded in the femtocell base station list in Step 105 (Step 105).

Since the macrocell base station 81 is not recorded in the femtocell base station list, the controller 31 determines that the cell search process has not been completed (Step 106; No). In a case where the cell base station 81 is recorded in the macrocell base station list, the controller 31 completes the cell search process in Step 107. On the other hand, in a case where the macrocell base station 81 is not recorded in the macrocell base station list, the controller 31 determines that the cell search process has not been completed by the cell search process of Step 107 (Step 108; No). In such a case, the controller 31 detects the macrocell base station 81 by performing the cell search process for all the synchronization timings and all the frequency bands (Step 109).

FIG. 3 is a diagram showing the example of movement of the cellular phone 70 that is within the zone of the macrocell 81 into a boundary area of the macrocell 83 that is adjacent to the macrocell 81. The receiver circuit (RX) 23 of the cellular phone 70 measures the values of the SINR and the RSSI on a regular basis (Steps 101 and 102), and the controller 31 compares the measured values of the SINR and the RSSI with the threshold values Ts and Tr (Steps 103 and 104).

On the boundary between the macrocell 81 and the macrocell 83, a wireless signal transmitted from the macrocell base station 81 and a wireless signal transmitted from the macrocell base station 83 are simultaneously received, and accordingly, the value of the SINR measured by the receiver circuit (RX) is lowered (Step 103; No).

On the boundary between the macrocell 81 and the macrocell 83, the cellular phone 70 is located in a position that is apart far from the macrocell base station 71 and the macrocell base station 73. Since the radio field intensity of a wireless signal that is transmitted from a base station decreases in proportion to the distance, the value of the RSSI measured by the receiver circuit (RX) 23 is lowered (Step 104; No).

In a case where the SINR is equal to or less than Ts and the RSSI is equal to or less than Tr, the controller 31 assumes that the cellular phone 70 is moved in the boundary of the macrocells and performs a cell search process. In order to give priority to detection of the macrocell, the controller 31 performs the cell search process by using the synchronization timing and the frequency band of the macrocell base station list that are stored in the memory unit 32 (Step 110).

In a case where information on the macrocell base station 73 is recorded in the macrocell base station list, the controller 31 detects the macrocell base station 73 in Step 105 (Step 111; Yes) and then ends the cell search determination (Step 116).

On the other hand, in a case where the information on the macrocell base station 73 is not recorded in the macrocell base station list due to no movement of the cellular phone 70 into the macrocell 83 or the like, the controller 31 cannot acquire a synchronization timing from the base station list (Step 111; No). In such a case, the controller 31 performs the cell search process by using the synchronization timing of the macrocell base station 81 (Step 112).

In a case where the macrocell base station 83 and the macrocell base station 81 perform transmission of wireless signals in accordance with a common synchronization timing by using a GPS system or the like, the controller 31 detects the macrocell base station 73 in Step 112 (Step 113; Yes) and then ends the cell search determination (Step 116).

Next, a case where a cellular phone 70 that is within the zone of the femtocell 84 is moved in a boundary area between the femtocell 84 and a macrocell 83 will be considered.

On the boundary between the femtocell 84 and the macrocell 83, wireless signals transmitted by the femtocell base station 74 and the macrocell base station 73 are asynchronous. Accordingly, the wireless signals transmitted by the femtocell base station 74 and the macrocell base station 73 interfere with each other. Therefore, when the cellular phone 70 is moved in the boundary between the femtocell 84 and the macrocell 83, the value of the SINR measured by the receiver circuit (RX) 23 is lowered (Step 103; No). On the boundary between the femtocell 84 and the macrocell 83, the cellular phone 70 is located in a position that is far apart from the femtocell base station 74 and the macrocell base station 73. Since the radio field intensity of a wireless signal that is transmitted from a base station decreases in proportion to the distance, the value of the RSSI measured by the receiver circuit (RX) 23 is lowered (Step 104; No).

Thereafter, the controller 31 performs the cell search process in the same sequence as described in Steps 104 to 116, and thereby detecting the femtocell base station 74. In addition, in a case where the controller 31 recognizes that the serving cell is the femtocell based on notification information such as transmission power information that is sent from the base station, the cell search process of Step 112 may be omitted.

In the cell search process described with reference to FIG. 4, an example in which the values of the SINR and the threshold value Ts are compared with each other and start of a cell search is triggered by checking that the SINR is less than the threshold value Ts has been described. Furthermore, by setting this threshold value Ts to be changed and resetting the value of the threshold value Ts in accordance with a change in the serving cell, a more flexible cell search process can be performed.

Figure 5:
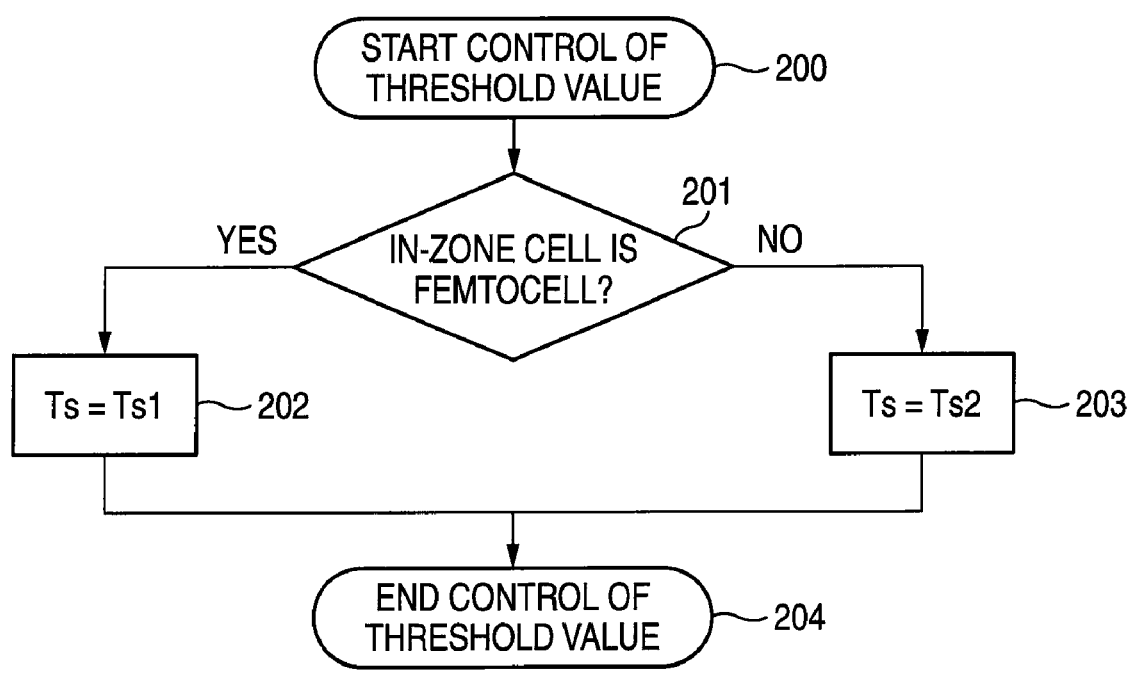
FIG. 5 is a flowchart of a process of setting a threshold value according to the embodiment.

Hereinafter, the flow of a threshold value setting process will be described with reference to FIG. 5. FIG. 5 is a flowchart illustrating the flow of a process of setting the threshold value Ts.

First, when starting the threshold value setting process (Step 200), the controller 31 determines whether or not the serving cell is a femtocell (Step 201). For example, the determination on whether or not the serving cell is a femtocell is based on the notification information, which is transmitted from the base station of the serving cell through the antenna 21, received by the controller 31. Then, it may be configured that the power transmission information of the base station included in the notification information is read out, and the serving cell is recognized as a femtocell under the condition that the transmission power information is equal to or less than a predetermined level.

Alternatively, the controller 31 may be configured to recognize that the base station of the serving cell is recorded in the femtocell base station list among base station lists stored in the memory unit 32. Furthermore, the controller 31 may be configured to recognize that the base station of the serving cell is a femtocell by using other base station information such as cell ID information or cell type information of the base station list stored in the memory unit 32.

When determining that the base station of the serving cell is a femtocell (Step 201; Yes), the controller 31 sets the threshold value Ts as Ts=Ts1 (Step 202) and ends the process (Step 203). On the other hand, determining that the base station of the serving cell is a cell other than a femtocell, for example, a macrocell (Step 201; No), the controller 31 sets the threshold value Ts as Ts=Ts2 (Step 203) and ends the process (Step 203). Here, the two threshold values are set such that a condition of Ts1<Ts2 is satisfied.

In a case where the controller 31 determines that the serving cell is a femtocell in the process described with reference to FIG. 5, the threshold value Ts is set to a small value. On the other hand, in a case where the controller 31 determines that the serving cell is a cell such as a macrocell other than a femtocell, the threshold value Ts is set to a large value. Accordingly, in a case where the cell search process described with reference to FIG. 4 is performed, the controller 31 performs the cell search process only when the value of the RSSI is lowered much in a case where the serving cell is a femtocell. On the other hand, the controller 31 performs the cell search process even when the value of the RSSI is not lowered much in a case where the serving cell is a macrocell.

In a case where the serving cell is determined to be a femtocell based on the above-described process, the controller 31 continuously uses the wireless communication line established within the femtocell until the signal quality largely deteriorates, and thereby the femtocell can be used for a long time. On the other hand, in a case where the serving cell is a macrocell, the controller 31 can detect a femtocell by performing a cell search by responding to a change in the signal quality in a speedy manner.

According to the above-described method, the determination on whether or not the cell search process is performed is performed by using two values of the SINR and RSSI. Accordingly, even in a case where the signal quality of the wireless signal of the macrocell base station 81 is good, the controller 31 can detect movement of the cellular phone into the boundary of the femtocell 82 and perform a cell search process. Thus, the cellular phone 70 moved in the femtocell 82 detects the femtocell base station 82 and performs a handover process as is necessary, and thereby the resources of the wireless communication lines of the cellular system can be effectively used.

In addition, according to the above-described method, the cell search process is performed by using the synchronization timing of the base station list and the synchronization timing of the serving cell that are stored in the memory unit 32. Accordingly, in a case where a base station to be detected is recorded in the base station list in advance, it is unnecessary to perform the cell search process by using all the synchronization timings and all the frequency bands. Therefore, the load on the controller 31 for the cell search process is decreased, and thereby the continuous use time of the cellular phone 70 can be improved. In addition, the processing time of the cell search process performed by the controller 31 is decreased, and thereby the cell search process can be performed in a speedy manner.

In addition, according to the above-described method, the receiver circuit (RX) 23 of the cellular phone 70 measures the SINR and the RSSI on a regular basis, and the cell search process is performed only in a case where the measured value is in a predetermined state. In a conventional cell search process, movement of the cellular phone into a macrocell or a femtocell is determined by regularly performing the cell search process regardless of the signal quality of the serving cell. However, a regular cell search process increases the processing load of the controller 31, and thereby an increase may occur in the current consumed.

According to the present invention, the controller 31 performs the determination on whether or not the cell search process is performed based on the value measured by the receiver circuit (RX) 23. Accordingly, an unnecessary cell search process is prevented from being performed, and thereby the load on the controller 31 for performing the cell search process is decreased. As a result, the continuous use time of the cellular phone 70 can be improved.

In addition, according to the above-described method, the controller 31 of the cellular phone 70 sets the threshold value Ts to a small value in a case where the serving cell is a femtocell. On the other hand, the controller 31 sets the threshold value Ts to a large value in a case where the serving cell is a macrocell. Accordingly, the controller 31 performs a cell search only when the signal quality greatly deteriorates in a case where the serving cell is a femtocell, and thereby the time for using the femtocell base station can be lengthened. On the other hand, in a case where the serving cell is a macrocell, the controller 31 performs a cell search by responding to a change in the signal quality in a speedy manner, and thereby the detection ratio of a femtocell can be increased.

In the above-described embodiment, the cellular phone has been described as an example of the mobile communication terminal. However, the scope of the present invention is not limited thereto. For example, the present invention can be applied to a PDA (Personal Digital Assistant) or a small-sized information processing device. The present invention is not limited to the above-described embodiments and may be embodied by changing the constituent elements within the scope not departing from the basic concept of the present invention. In addition, various inventions may be formed by appropriately combining a plurality of constituent elements disclosed in the above-described embodiments. For example, several constituent elements may be excluded from all the constituent elements represented in each embodiment.

Although the embodiment according to the present invention has been described above, the present invention is not limited to the above-mentioned embodiment but can be variously modified. Constituent components disclosed in the aforementioned embodiment may be combined suitably to form various modifications. For example, some of all constituent components disclosed in the embodiment may be removed or may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal comprising:
an antenna that performs transmission and reception of a wireless signal;
a communication unit that performs communication with a base station by establishing a wireless communication line with the base station through the antenna;
a memory unit that stores synchronization information of the wireless communication line established by the communication unit;
a measuring unit that measures reception power level and signal quality of the wireless signal received by the antenna; and
a cell search processor that detects the base station based on the synchronization information stored in the memory unit in a case where the reception power level is larger than a predetermined value and the signal quality is lower than a predetermined signal quality threshold value,
wherein the synchronization information stored in the memory unit comprises:
first synchronization information that is classified as a first synchronization information list; and second synchronization information classified as a second synchronization information list different from the first synchronization information list, and wherein the cell search processor detects the base station based on the first synchronization information in a case where the reception power level is larger than the predetermined value and the signal quality is lower than the predetermined signal quality threshold value and detects the base station based on the second synchronization information in a case where the reception power level is less than the predetermined value and the signal quality is lower than the predetermined signal quality threshold value.

2. The mobile communication terminal according to claim 1, wherein the synchronization information comprises a list of base stations and synchronization timing and signal patterns of the respective base stations.

3. The mobile communication terminal according to claim 1, wherein the first synchronization information comprises information for establishing the wireless communication line with a femtocell base station, and wherein the second synchronization information comprises information for establishing the wireless communication line with a macrocell base station.

4. The mobile communication terminal according to claim 1, wherein the cell search processor detects the base station based on synchronization time information of the wireless communication line established by the communication unit in a case where the reception power level is less than the predetermined value and the signal quality is lower than the predetermined signal quality threshold value.

5. The mobile communication terminal according to claim 1, wherein the communication unit acquires a value of transmission power level of the base station with which the wireless communication line is being established, and wherein the cell search processor sets a first signal quality threshold value as the signal quality threshold value in a case where the value of the transmission power level acquired by the communication unit is larger than a predetermined value and sets a second signal quality threshold value, which is less than the first signal quality threshold value, as the signal quality threshold value in a case where the value of the transmission power level acquired by the communication unit is less than the predetermined value.

6. The mobile communication terminal according to claim 1, wherein the measuring unit measures the reception power level by measuring at least one of a Received Signal Strength Indicator (RSSI) and a Reference Signal Received Power (RSRP) of the wireless signal.

7. The mobile communication terminal according to claim 1, wherein the measuring unit measures the signal quality by measuring at least one of a Signal to Interference and Noise Power Ratio (SINR), an Energy Per Symbol to Interference Density Ratio (Es/Io), and a Signal to Interference Ratio (SIR) of the wireless signal.

8. The mobile communication terminal according to claim 1, wherein the cell search processor detects the base station by performing a cell search process when the base station is undetected by use of the synchronization information stored in the memory unit.

9. A non-transitory computer-readable medium containing a computer program executable by a computer system for a mobile communication terminal to cause the computer system to operate in accordance with a sequence of procedure, the procedure comprising:

performing communication with a base station by establishing a wireless communication line with a base station through an antenna;

storing synchronization information of the wireless communication line;

measuring reception power level and signal quality of a wireless signal received by the antenna; and detecting the base station based on the synchronization information in a case where the reception power level is larger than a predetermined value and the signal quality is lower than a predetermined signal quality threshold value, wherein the synchronization information stored in the memory unit comprises:

first synchronization information that is classified as a first synchronization information list; and second synchronization information classified as a second synchronization information list different from the first synchronization information list, and the base station is detected based on the first synchronization information in a case where the reception power level is larger than the predetermined value and the signal quality is lower than the predetermined signal quality threshold value and detects the base station based on the second synchronization information in a case where the reception power level is less than the predetermined value and the signal quality is lower than the predetermined signal quality threshold value.

* * * * *